(12) United States Patent
Abraham et al.

(10) Patent No.: US 8,725,680 B2
(45) Date of Patent: May 13, 2014

(54) MEDIA CONTENT LOCATION AWARENESS AND DECISION MAKING

(75) Inventors: Jeffrey C. Abraham, Seattle, WA (US); Bruno K. da Costa, Redmond, WA (US); Zach Johnson, Woodinville, WA (US); Shane McRoberts, Seattle, WA (US); Andrew L. Silverman, Redmond, WA (US); Joseph McClanahan, Redmond, WA (US); Robert N. Pulliam, Seattle, WA (US); Rodrigo Bomfim, Renton, WA (US); Sean Kollenkark, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/023,413

(22) Filed: Feb. 8, 2011

(65) Prior Publication Data

US 2012/0203796 A1  Aug. 9, 2012

(51) Int. Cl.
*G06F 17/00* (2006.01)
*G06F 7/00* (2006.01)

(52) U.S. Cl.
USPC ........... 707/609; 707/610; 707/617; 707/618; 709/248

(58) Field of Classification Search
None
See application file for complete search history.

(56) References Cited

U.S. PATENT DOCUMENTS

| | | | |
|---|---|---|---|
| 2006/0085819 A1 | 4/2006 | Bruck et al. | |
| 2009/0063450 A1* | 3/2009 | Petri | 707/5 |
| 2009/0282093 A1 | 11/2009 | Allard et al. | |
| 2009/0299725 A1 | 12/2009 | Grigsby et al. | |
| 2009/0300169 A1 | 12/2009 | Sagar et al. | |
| 2010/0199276 A1* | 8/2010 | Umbehocker | 718/1 |
| 2010/0211924 A1* | 8/2010 | Begel et al. | 717/101 |
| 2010/0229082 A1* | 9/2010 | Karmarkar et al. | 715/205 |
| 2010/0332401 A1* | 12/2010 | Prahlad et al. | 705/80 |
| 2010/0332456 A1* | 12/2010 | Prahlad et al. | 707/664 |
| 2010/0332818 A1* | 12/2010 | Prahlad et al. | 713/150 |
| 2010/0333116 A1* | 12/2010 | Prahlad et al. | 719/328 |
| 2011/0231363 A1* | 9/2011 | Rathod | 707/609 |

FOREIGN PATENT DOCUMENTS

CN         1606295 A     4/2005

OTHER PUBLICATIONS

Neder, Mary Ann, "ZumoDrive for Android Released, Cloud Media Storage", Retrieved at << http://appmodo.com/15336/zumodrive-for-android-released/ >>, Mar. 17, 2010, pp. 4.
"SugarSync", Retrieved at << https://www.sugarsync.com/ >>, Retrieved Date : Oct. 29, 2010, pp. 2.

(Continued)

*Primary Examiner* — Angelica Ruiz
(74) *Attorney, Agent, or Firm* — Micah Goldsmith; Glen Johnson; Micky Minhas

(57) ABSTRACT

Various embodiments related to the ability to find content for consumption across all endpoint computing devices in a computing system are disclosed. For example, one disclosed embodiment provides a method for presenting content including aggregating endpoint metadata for each endpoint computing device in a computing system and content metadata of content stored on each of a plurality of endpoint computing devices, receiving a request for a content item on a selected endpoint computing device, querying aggregated endpoint metadata and content metadata to find instances of the content item and corresponding endpoint computing device locations, generating a ranked list of instances of the content item based on selection criteria, and selecting an instance of the content item from the ranked list for playback by the selected endpoint computing device.

19 Claims, 3 Drawing Sheets

(56) References Cited

OTHER PUBLICATIONS

"Store, Protect and Leverage Your Digital Assets", Retrieved at << http://www.nirvanix.com/solutions/media-entertainment.aspx >>, Retrieved Date: Oct. 29, 2010, p. 1.

State Intellectual Property Office of China, Office Action of Chinese Patent Application No. 201210026534.2, Jan. 6, 2014, 11 pages.

* cited by examiner

MEDIA CONTENT LOCATION AWARENESS AND DECISION MAKING

BACKGROUND

End users often have media collections that are spread across multiple endpoint computing devices (e.g., phones, personal computers, laptops, gaming consoles, tablet devices, etc.) spanning multiple networks. With the advent of fast network connections to most devices, and the ability to maintain almost continuous connectivity for many endpoints, users need not have a local copy of a piece of content in order to access it. However, presently there is no way to know the location of all content in a user's collection from any of the user's endpoint computing devices in the user's domain. Moreover, presently there is no way to make intelligent decisions about selecting a instance of a content item for playback when multiple instances of the same content item are located on different endpoint computing devices so as to maintain a high quality user experience.

SUMMARY

Various embodiments related to the ability to find content for consumption across all endpoint computing devices in a computing system are disclosed. For example, one disclosed embodiment provides a method for presenting content including aggregating endpoint metadata for each of a plurality of endpoint computing devices in a computing system and content metadata of content stored on each endpoint computing device, receiving a request for a content item on a selected endpoint computing device, querying aggregated endpoint metadata and content metadata to find instances of the content item and corresponding endpoint computing device locations, generating a ranked list of instances of the content item based on selection criteria, and selecting an instance of the content item from the ranked list for playback by the selected endpoint computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present description is related to the ability to find media content across all endpoint computing devices in a user's domain or computing system. In other words, all media content may be exposed to each computing device in the user's domain. More particularly, the present description is related to selecting an instance of a content item for playback without interaction from the user by making intelligent decisions based on selection criteria. Such decisions may be made based on endpoint metadata that describes characteristics of each endpoint computing device in a user's domain, as well as content metadata that describes characteristics of each content item including which endpoint computing device the content item is located on. Moreover, when different instances of a content item are stored in multiple endpoint computing device locations in the user's computing system, selection criteria may be applied to determine which instance of the content item should be retrieved for playback to the user.

Figure 1:
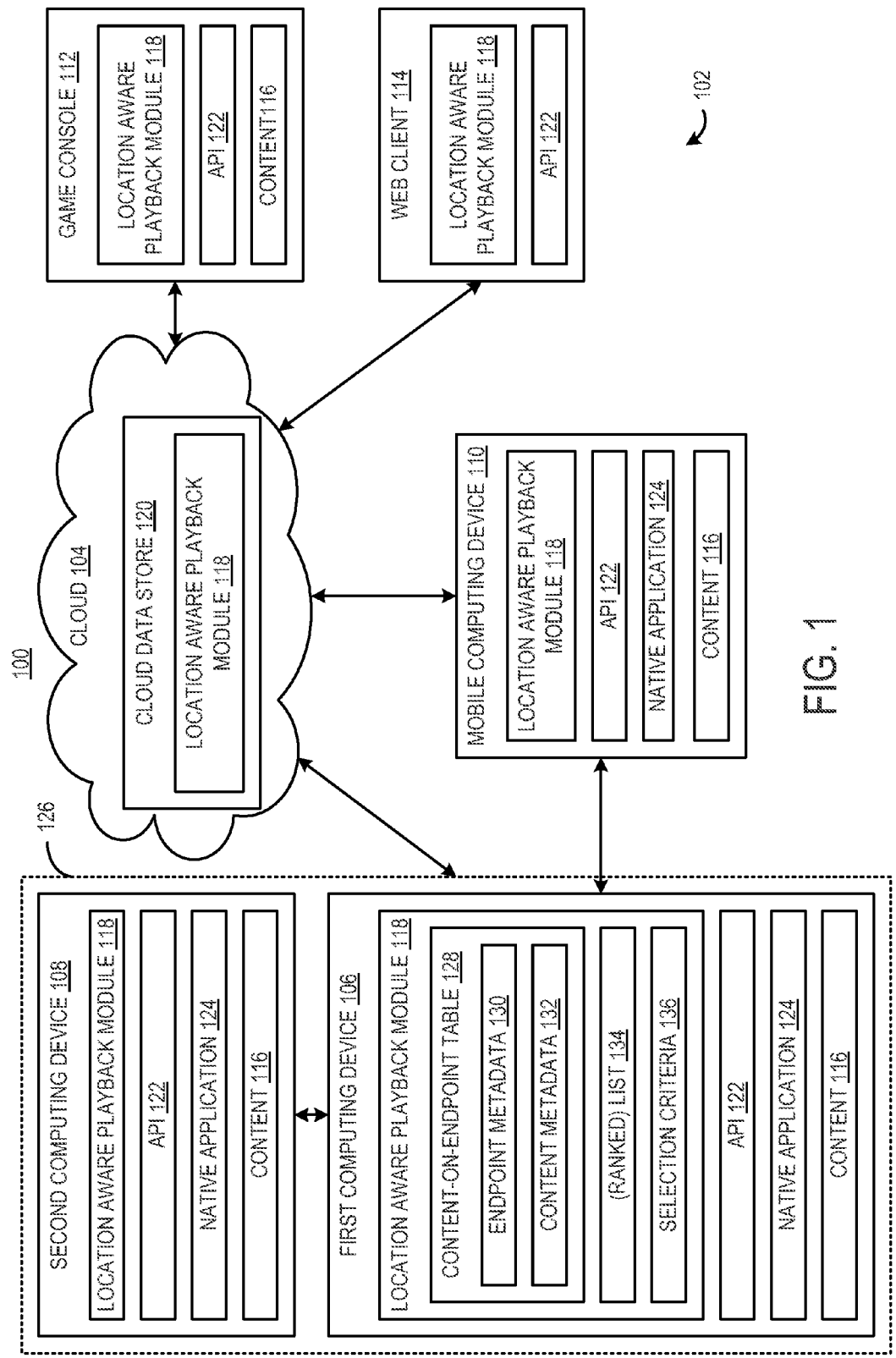
FIG. 1 is a block diagram of an embodiment of a computing system of the present disclosure.

FIG. 1 shows a block diagram of an embodiment of a computing system 100 of the present disclosure. The computing system 100 may include a plurality of endpoint computing devices 102 that may be operatively coupled or in communication via a computing cloud 104. The computing cloud 104 may include various interconnected networks whereby shared computing devices (e.g., servers) can provide, pass, or share resources, software, and/or data to any, some, or all of the plurality of endpoint computing devices 102 and/or other devices as desired.

In the illustrated embodiment, the plurality of endpoint computing devices 102 may represent various computing devices in a user's domain or computing system. In other words, the plurality of endpoint computing devices may be accessed, used, and/or owned by the user. Such endpoint computing devices may be located in different locations, such as the user's home, school, office, car, person, etc. Moreover, such computing devices may be used for different applications, such as entertainment, education, occupation, communication, travel, etc. For example, the plurality of endpoint computing devices 102 may include a first computing device 106 (e.g., a personal computer), a second computing device 108 (e.g., a laptop computer), a mobile computing device 110 (e.g., a smart phone), and a game console 112. Additionally, the plurality of endpoint computing devices 102 may include a web client 114 that may be employed by the user to access the user's domain from another suitable computing device. For example, the web client 114 may be employed by the user to access the user's media collection from a public computer, such as at a library. As another example, the web client 114 may be employed by the user to access the user's media collection from a friend's computer. In some implementations, an endpoint of the user's domain may include a virtual marketplace, library, website, or other store hosted by a third party from which a user may retrieve or receive a license for a content item for consumption. Note in some implementations, the computing cloud 104 including the cloud data storage 120 may be classified as an endpoint of the user's domain.

In addition to being operatively coupled through the computing cloud 104, some endpoint computing devices may be directly connected without communicating through the computing cloud. For example, the first computing device 106 and the second computing device 108 may communicate through a local area network 126 without connecting to the computing cloud. As another example, the mobile computing device 110 may directly connect to the first computing device 106, such as though a universal serial bus (USB) cable. Such connections, in some cases, may enable various synchronization, streaming, and/or playback operations to be carried out without communication through the computing cloud.

Each of the plurality of endpoint computing devices 102 may include or be configured to execute an application programming interface (API) 122. The API 122 may enable communication between endpoint computing devices through the computing cloud 104. The API 122 may be employed for lighter weight operations, such as streaming playback of a content item. The API 122 is a suitable vehicle for lower capability endpoint computing devices to carry out various operations; however it should be appreciated that the API 122 may be employed by any of the plurality of endpoint computing devices 102.

Furthermore, some of the plurality of endpoint computing devices 102 may include or be configured to execute a native application 124 that uses the resources of an endpoint computing device to perform various synchronization, streaming, and/or playback operations. In some implementations, the native application 124 may be executed on a fully capable endpoint computing device such as the first computing device 106, which may have a persistent connection to the computing cloud 104, and hold content 116, and also may have processing capability to carry out content item synchronization and management operations.

The plurality of endpoint computing devices 102 collectively stores a user's media collection, which may include different content items 116. As an example, content items 116 may include any suitable digital media, such as an image file, video file, audio file, or the like. In some cases, one or more content items 116 of the media collection may be stored in multiple locations. For example, a song may be stored on a user's personal computer as well as the user's smart phone. In some cases, more than one instance of a content item 116 may exist in the media collection. For example, an access restricted (e.g., digital rights management (DRM) restricted) instance of a song as well as a restriction-free instance of the song may be stored on a user's personal computer (or another endpoint computing device).

As discussed above, in order to expose a user's media collection to each endpoint computing device in the computing system 100, metadata may be aggregated for each endpoint computing device as well as metadata for each instance of content stored on each computing device. In particular, each computing device may be configured to execute a location aware playback module 118. The location aware playback module 118 may be configured to enable metadata synchronization of the plurality of endpoint computing devices 102 so that each endpoint is aware of each instance of each content item for playback. In particular, each endpoint computing device may be made aware of the storage location of every instance of every content item 116 in the user's media collection, as well as characteristics of each endpoint computing device and each instance of each content item via endpoint metadata 130 and content metadata 132. The endpoint metadata 130 and the content metadata 132 may be taken into consideration when retrieving an instance of a content item for playback on a selected endpoint computing device to provide a most suitable playback experience. For example, endpoint metadata 130 may include endpoint computing device capability, online status, connectivity speed/rate, network location, battery life, display capabilities, and streaming capabilities. Further, content metadata 132 may include access restrictions, encoding bit rate, format including resolution, audio streams (e.g., 2 channel, 5.1, 7.1, etc.), languages, subtitles, and playback state. Note although not shown in FIG. 1, each instance of the location aware playback module 118 may include elements listed in the elaborated example implemented on the first computing device 106, including endpoint metadata 130 and content metadata 132.

In some implementations, the process for synchronizing the plurality of computing devices 102 may be cloud-based. For example, each endpoint computing device may send endpoint metadata 130 about that endpoint computing device, as well as content metadata 132 about each instance of each content item stored on that endpoint computing device to the computing cloud 104. Endpoint metadata 130 and content metadata 132 aggregated from the plurality of endpoint computing devices 102 may be held or stored in cloud data storage 120. In some implementations, the endpoint metadata 130 and the content metadata 132 may be aggregated into a content-on-endpoint table 128. In some implementations, the content-on-endpoint table 128 may be stored locally on one or more endpoint computing devices. The cloud data storage 120 may be synchronized or made available to each of the plurality of endpoint computing devices through a query across all of the user's endpoint computing devices, such as through the API 122. In some cases, an endpoint computing device may send metadata to the cloud data storage 120 responsive to the metadata being updated. In some cases, endpoint computing devices with intermittent cloud connectivity/connection persistence, such as a mobile computing device, the endpoint computing device may send metadata to the cloud data storage 120 responsive to connection to the computing cloud.

Additionally or alternatively, in some implementations, the process for metadata synchronization between the plurality of computing devices 102 may be peer-to-peer (P2P) based. For example, each endpoint computing device may include a data store, such as content-on-endpoint table 128 including endpoint metadata 130 and content metadata 132 aggregated from all of the user's endpoint computing devices in the computing system 100. Synchronization may be performed by P2P queries of each computer to aggregate the metadata, such as through the API 122. Note the herein described aggregation operations are exemplary and other aggregation operations may be performed without departing from the scope of this description. Further, note endpoint metadata and content metadata may be maintained and/or synchronized at each storage location even as changes are made to the endpoint computing devices, the endpoint lists, and the content being contained in the computing system.

Once the different instances of the content items and their storage locations have been exposed to each of the endpoint computing devices through the aggregation of endpoint and content metadata, the location aware playback module 118 may facilitate retrieval of content for user consumption from any of the endpoint computing devices in the user's domain. In particular, the location aware playback module 118 may be configured to receive a request for a content item on a selected endpoint computing device, such as a user request to listen to a song. The location aware playback module 118 may query aggregated endpoint metadata and content metadata locally or in the cloud data storage 120 to find the location of available instances of the requested content item. When multiple instances of the requested content item exist at different locations in the computing system, the query may produce a list 134 of available instances of the content item. As an example, an instance of a content item may be available if the endpoint computing device that the instance is stored on is currently connected to the computing cloud. As another example, if an instance of a content item is access restricted, a license to playback the content has to be acquired for the instance to be considered available.

The location aware playback module 118 may rank the list 134 of available instance of the content item or generate a ranked list based on selection criteria 136. The selection criteria 136 may include access restrictions, network topology, network bandwidth, service cost to transfer content (e.g., relay vs. subnet), user costs (e.g. prefer WiFi over over-the-air transmission, such as 3G), continued availability of the source endpoint computing device (e.g., persistence on a network), proximity and/or latency, playback device capability (e.g., what is the device capable of streaming, does the device have the ability to transcode content to other formats, etc.), and/or another suitable playback factor.

In some implementations, each instance of a content item in the list of available instance may be awarded a score based on the selection criteria. For example, the selection criteria may have a priority order or a weight that adds to the score of a content item. The scoring of the selection criteria may be as follows.

For access restriction, if DRM or another access restriction is not present, in other words the instance is restriction-free; increase the score of the instance. Otherwise, if the instance has an access restriction, the score of the instance may be decreased. Moreover, if a license for the instance cannot be attained, the instance may be removed from the list.

For network topology, the topology may be learned as a result of aggregation operations and it may be determined if any instances are stored on endpoint computing devices that are directly reachable on a local subnet. In one example, a technology such as Simple Service Discovery Protocol (SSDP) and/or Universal Plug and Play (UPNP) may be employed to carry out such determinations. As another example the determination may be made based on the number of network hops between the two endpoints involved. If an instance is reachable on the local subnet (or directly connected) the score may be increased. Otherwise, the score may be decreased. For example, the first computing device 106 may request an instance of a content item that is available from both the second computing device 108 and through the computing cloud 104. Since the first computing device and the second computing device are connected via the local area network 126 and share the same subnet, the instance stored on the second computing device 108 may have a greater score increase than the instance stored on the device accessible through the computing cloud.

For network bandwidth, the score may be increased proportionally to the available bandwidth of a corresponding endpoint computing device. In some implementations, the score increase may be capped at a maximum streaming rate if playback of the content item is streamed and not downloaded. For example, two different instances of a content item may be stored at the same endpoint computing device, such as high definition and standard definition instances of the same film. In some cases, the score increase for the standard-definition instance of the content item may be higher than the score increase for the high-definition instance to save bandwidth depending on the selected endpoint capabilities.

For service cost to transfer content (e.g., relay vs. subnet or direct connect), if transferring the content from an endpoint computing device that connects through the cloud (and potentially incurs a cost to the service operator), then the score may be lowered. On the other hand, the score may be increased if the endpoint computing device on which the instance is stored is on the same subnet, local area, or is otherwise able to negotiate firewall/network address translation (NAT) boundaries and connect directly to the selected endpoint computing device to receive the instance of the content item. In some implementations, there may be an additional score increase for connecting wired vs. wirelessly in the case of the same subnet.

For user costs, some network connections (e.g., 3G/4G/LTE), such as over cellular networks may have significantly higher bandwidth costs associated with them than other wired/wireless networks. As such, the score may be increased for using "free" networks, such as a restriction-free WiFi hotspot. Otherwise, the score may be decreased for using other networks.

For continued availability of a source or network persistence, in cases where the endpoint computing device on which the instance is stored is not a desktop computer, it is more likely that the endpoint computing device will become inaccessible (e.g. laptop going to sleep, phone moving out of range, game console used to play games and unable to satisfy content requests, etc.), and as a result a instance of a content item should be retrieved from sources likely to remain available in order to increase the possibility of successfully transferring the content. As such, the score may be increased for instances stored on non-transient endpoint computing devices, which may be determined from endpoint metadata. On the other hand, the score may be decreased for instances stored on transient endpoint computing devices. In some implementations, continued availability may be scored differently depending on a content type. As an example, continued availability may have less of an impact when streaming/copying music compared to video because music files are usually much smaller and can be transferred in less time.

For endpoint proximity/latency, endpoint computing devices that are "closer" in a network sense to one another are more likely to provide a better streaming/download experience. As such, the score may be increased for instances stored on lower latency and/or closer proximity endpoint computing devices. On the other hand, the score may be decreased for instances stored on higher latency and/or further distance endpoint computing devices.

For device capability, device capability may be measured based on how well an endpoint computing will stream content, and at what resolutions and/or bitrates a content item may be presented. As such, the score may be increased based on how well an instance and/or endpoint computing device matches the endpoint computing device selected for playback. For example, if an endpoint computing device including a high definition display is selected for playback, a higher-resolution instance of a video may have a greater score increase than a lower-resolution instance. As another example, if a mobile phone is selected for playback, an instance that matches the resolution of the mobile phone may be awarded a greater score increase than another instance that has higher or lower resolution. Note, in some implementations a score may merely remain the same instead of being decreased. In other words, no score increase may be awarded to a instance that does not meet a give selection criterion. Furthermore, in some cases, device capability may include battery life. For example, a plugged-in laptop or desktop computing device may be scored higher than a mobile device operating on the same network.

Once the list 134 of available instances of the content item is scored and ranked according to the above described selection criteria, the location aware playback module 118 may be configured to select an instance of the content item from the ranked list for playback by the selected endpoint computing device. In some implementations, the instance with the highest ranking or score may be selected for playback. Further, the ranked list may be maintained until successful playback of the content item. If playback of a selected instance does not complete for a given reason, such as disconnection of an endpoint computing device from the computing cloud, the next highest ranked instance may be selected from the ranked list for playback, and so on until playback is successfully completed or the list is exhausted. In some implementations, the ranked list may be presented to the user, and an instance may be selected in accordance with user input indicating the selection. In some implementations, 3rd party instances from marketplaces may be scored higher and may be selected above some instances stored on user endpoint computing device locations.

Depending on the nature of the playback request, the device capability, and/or the connection between the playback device selected and the device on which the selected instance of the content item is stored, playback may be performed differently. In some cases, playback may include sending/receiving a copy of a selected instance of a content item at an endpoint computing device, such as via a native application executable by the endpoint computing device. For example, the first computing device 106 may hold an instance of a content item that is selected from the ranked list for playback at the second computing device 108. Accordingly, a copy of the selected instance of the content item may be sent from the second computing device 108 to the first computing device 106 via the local area network 126. As another example, the first computing device 106 may hold an instance of a content item that is selected from the ranked list for playback at the mobile computing device 110, and the mobile computing device 110 may be directly connected to the first computing device 106. Accordingly, a copy of the selected instance of the content item may be sent from the first computing device 106 to the mobile computing device 110 via the direction connection (e.g., a USB cable).

Furthermore, in some cases, playback may include streaming a selected instance of a content item to an endpoint computing device, such as via an API. For example, a user may be accessing the location aware playback module 118 through the web client 114 to request playback of an instance of a content item from the first computing device 106. In this example, the web client 114 may have limited capability. Accordingly the first computing device 106 streams the selected instance to the web client 114. As another example, the mobile computing device 110 may stream an instance of a content item from the computing cloud 104, such as from a content marketplace service.

Note, playback as used herein may include sending a copy of an instance of a content item from one endpoint to another for immediate consumption or for later consumption, as well as streaming an instance of a content item.

In different implementations, endpoint computing devices may take the form of a mainframe computer, server computer, desktop computer, laptop computer, tablet computer, home entertainment computer, home entertainment device (e.g., television with data storage capabilities), network computing device, mobile computing device, mobile communication device, gaming device, tablets, etc.

Furthermore, each endpoint computing device may include a processing device and a data storage device. The processing device includes one or more physical devices configured to execute one or more instructions. For example, the processing device may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The data storage device may include one or more physical, non-transitory, devices configured to hold data and/or instructions executable by the logic subsystem to implement the herein described methods and processes. When such methods and processes are implemented, the state of the data storage device may be transformed (e.g., to hold different data). The data storage device may include removable computer-readable storage media and/or built-in devices. The data storage device may include optical memory devices (e.g., CD, DVD, HD-DVD, Blu-Ray Disc, etc.), semiconductor memory devices (e.g., RAM, EPROM, EEPROM, Flash memory, etc.) and/or magnetic memory devices (e.g., hard disk drive, floppy disk drive, tape drive, MRAM, etc.), among others. The data storage device may include devices with one or more of the following characteristics: volatile, nonvolatile, dynamic, static, read/write, read-only, random access, sequential access, location addressable, file addressable, and content addressable data storage.

The terms "module," "program," and "engine" may be used to describe an aspect of computing system 100 that is implemented to perform one or more particular functions. In some cases, such a module, program, or engine may be instantiated via the processing device executing instructions held by the data storage device. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

In some implementations, particular endpoint computing devices may not have access to or knowledge of all instances of all the content of a user's domain. For example, each endpoint computing device may select or be restricted to which subtypes of content metadata to consume and synchronize with the computing cloud. The computing cloud may store all content metadata subtypes. As a particular example, a mobile endpoint computing device may only have a partial view of the user's content collection (e.g., music but not videos). As one example, partial access to a user's content collection may be employed due to limitations in device capability.

Figure 2:
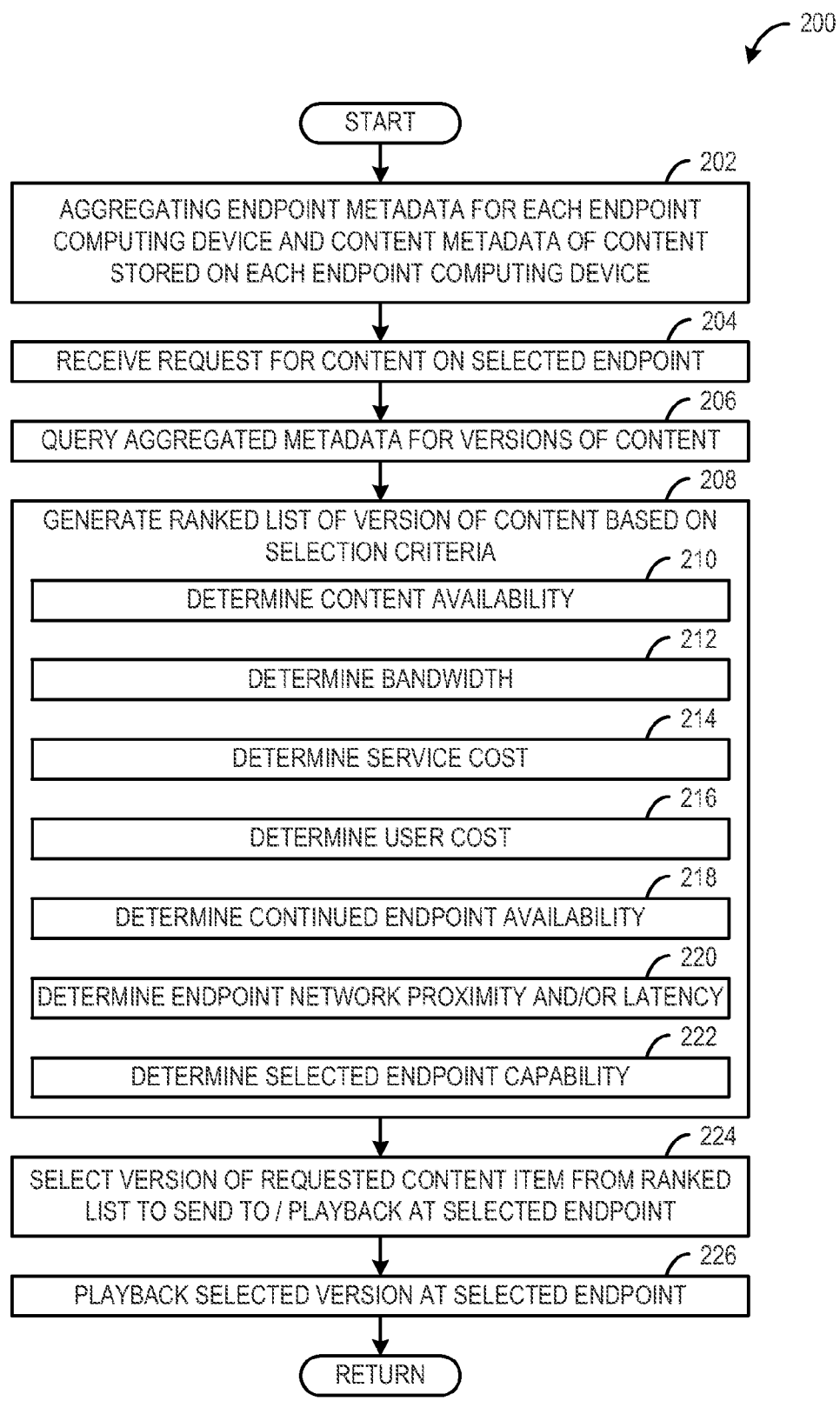
FIG. 2 is a flow diagram of an embodiment of a method for presenting content.

FIG. 2 is a flow diagram of an embodiment of a method 200 for presenting content. In one example, the method 200 may be executed by an endpoint computing device of computing system 100. At 202, the method includes aggregating endpoint metadata for each endpoint computing device in a computing system and content metadata of content stored on each endpoint computing device. In some implementations, endpoint metadata includes endpoint computing device capability, online status, connectivity speed/rate, and network location. In some implementations, content metadata includes access restrictions, encoding bit rate, format, and playback state. In some implementations, aggregating may include building a content-on-endpoint table to aid in retrieving the storage location of different instances of content items. In some implementations, aggregated endpoint metadata and content metadata may be stored at cloud storage accessible by each endpoint computing device in the user's domain or computing system. In some implementations, aggregated endpoint metadata and content metadata may be stored at each endpoint computing device in the user's domain or computing system.

At 204, the method may include receiving a request for a content item on a selected endpoint computing device.

At 206, the method may include querying the aggregated endpoint metadata and content metadata to find instances of the requested content item and endpoint computing device locations corresponding to the instances. In some implementations, querying may include providing inputs to the content-on-endpoint table to retrieve available instances.

At 208, the method may include generating a ranked list of instances of the requested content item based on selection criteria. In some implementations, at 210, the method may include generating a ranked list based on selection criteria that include the determined availability of the instances. For example, the method may include determining whether any instances are unavailable due to access restrictions without the ability to attain a license for playback, such as DRM restrictions. Alternatively or additionally, as another example, the method may include determining whether any instances are unavailable due to an inability to connect to an endpoint computing device on which a instance is stored, such as an endpoint device that is intermittently or not connected to the computing cloud. If a instance is determined to be unavailable, it may receive a low ranking or may not be included in the ranked list. Furthermore, instances considered unavailable at any given time may be tracked in the cloud data storage 120 to check whether the availability changes and a score or ranking may change accordingly.

In some implementations, at 212, the method may include generating a ranked list based on selection criteria that include the determined bandwidth of an endpoint device on which a instance is stored. For example, instances stored on endpoint computing devices with higher bandwidth may be ranked higher on the list and instance stored on endpoint computing devices with lower bandwidth may be ranked lower on the list. In implementations where instances are scored, a higher bandwidth instance may receive a score increase that is larger than a score increase of a lower bandwidth instance.

In some implementations, at 214, the method may include generating a ranked list based on selection criteria that include the determined service cost to transfer a instance. For example, instances stored on endpoint computing devices owned by the user may be ranked higher on the list and instances stored on endpoint computing devices owned by a service provider (e.g., a server computing device hosting an online marketplace) may be ranked lower on the list. In implementations where instances are scored, a instance stored on a user-owned endpoint computing device may receive a score increase that is larger than a score increase of a instance stored on a service provider-owned endpoint computing device.

In some implementations, at 216, the method may include generating a ranked list based on selection criteria that include the determined user cost of a instance. For example, instances transferred over some network connections (e.g., 3G/4G/LTE), such as over cellular networks may have significantly higher bandwidth costs associated with them than other wired/wireless networks, such as a WiFi or direct connection. As such, instances transferable over a lower user cost connection may be ranked higher on the list and instances transferred over a higher user cost connection may be ranked lower on the list. In implementations where instances are scored, a lower user cost instance may receive a score increase that is larger than a score increase of a higher user cost instance.

In some implementations, at 218, the method may include generating a ranked list based on selection criteria that include the determined availability of an endpoint computing device. For example, instances stored on endpoint computing devices having a persistent connection to the computing cloud, such as a desktop computing device with a wired connection, may be ranked higher on the list and instances stored on endpoint computing devices with a less persistent connection, such as a smart phone having a cellular connection to the computing cloud, may be ranked lower on the list. In implementations where instances are scored, a more persistently connected instance may receive a score increase that is larger than a score increase of a less persistently connected instance.

In some implementations, at 220, the method may include generating a ranked list based on selection criteria that include the determined proximity and/or latency of an endpoint computing device on which a instance is stored. For example, instances stored on endpoint computing devices that are closer on a network topology (e.g., on the same subnet) or have lower latency may be ranked higher on the list and instances stored on endpoint computing devices that are farther on a network topology or have higher latency may be ranked lower on the list. In implementations where instances are scored, a closer or lower latency instance may receive a score increase that is larger than a score increase of a farther or higher latency instance.

In some implementations, at 222, the method may include generating a ranked list based on selection criteria that include the determined capability of the endpoint computing device selected for playback of the requested content item. For example, instances having a format that more closely matches the playback capability of the selected endpoint computing device may be ranked higher on the list and instances that less closely match the playback capability of the selected endpoint computing may be ranked lower on the list. As an example, a lower resolution formatted instance is ranked higher than a higher resolution formatted instance when the playback capability of the requested endpoint computing device has lower resolution playback capability. In implementations where instances are scored, a more closely matching instance may receive a score increase that is larger than a score increase of a less closely matching instance.

Note in different implementations, the above described selection criteria may be considered alone or in conjunction to rank the different instances of a requested content item. Moreover, in some implementations, user input may skew scoring based on the above described selection criteria.

At 224, the method may include selecting a instance of the requested content item from the ranked list to send to and/or playback at the selected endpoint computing device. In some implementations, the method may include selecting a high ranked instance from the ranked list.

At 226, the method may include presenting the selected instance of the requested content item at the selected endpoint computing device.

The above described method has the potential advantage that it may expose all different instances of content items in a user's domain to all endpoint computing devices and may provide the ability to select a best fit instance of a content item for transfer and/or playback based on a selected endpoint computing device's connection characteristics and/or capability at any endpoint computing device in the user's domain.

Figure 3:
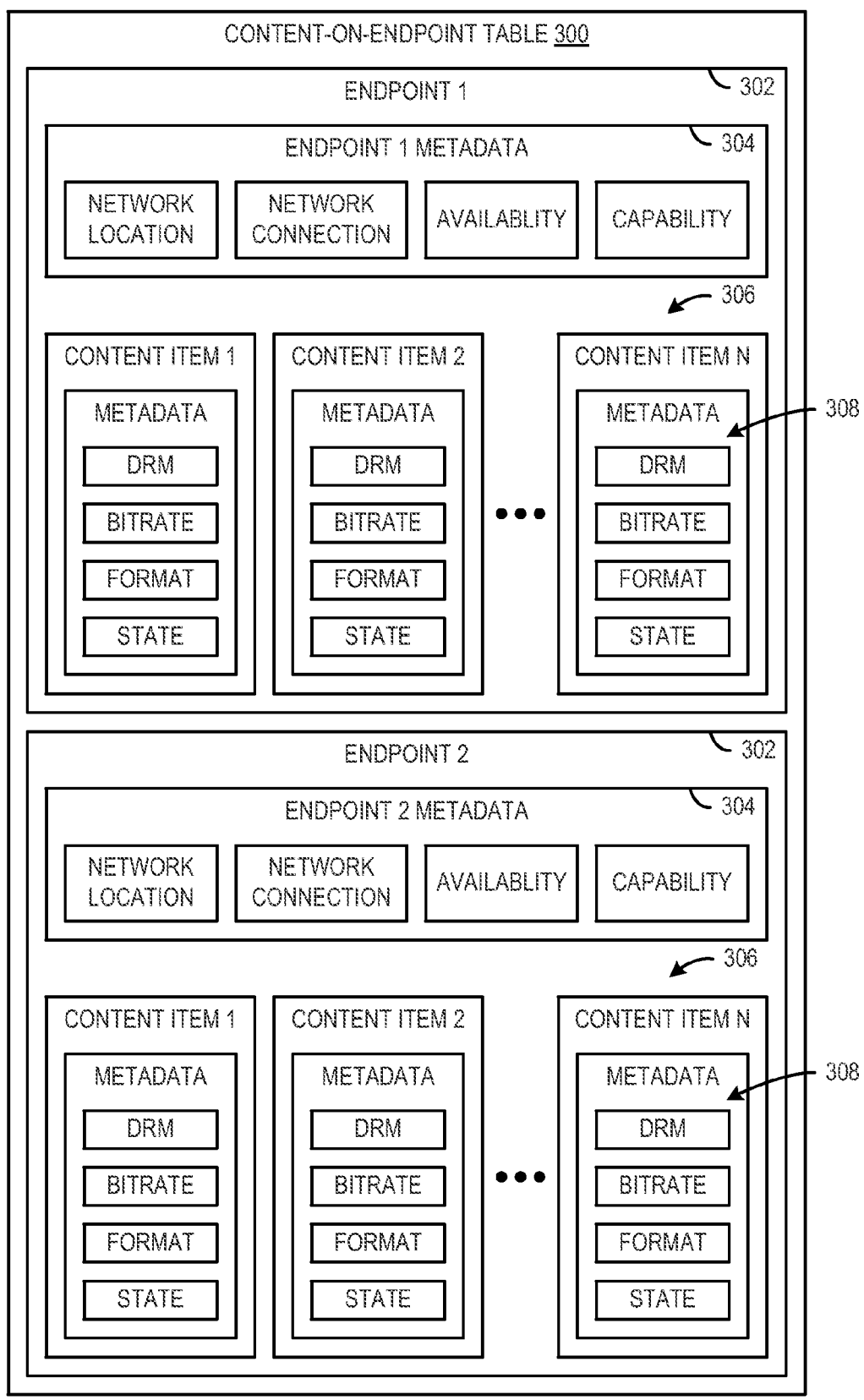
FIG. 3 is a block diagram of an embodiment of a content-on-endpoint table.

FIG. 3 is a block diagram of an embodiment of a content-on-endpoint table 300. The content-on-endpoint table 300 may be generated via aggregation of metadata from endpoint computing devices in the user's domain. In particular, the content-on-endpoint table 300 may include representations 302 of each endpoint computing device in the user's domain. Each endpoint computing device representation 302 may include endpoint metadata 304. For example, endpoint metadata may include computing device capability, online status, connectivity speed/rate, and network location.

Furthermore, each endpoint computing device representation 302 may include representations of each instance 306 of each content item stored on the endpoint computing device. Each instance 306 may include content metadata 308. For example, content metadata may include access restrictions, encoding bit rate, format, and playback state.

Through the aggregation of such metadata, each of the endpoint computing devices in the user's domain may be synchronized to expose all instances of content in the user's domain at every endpoint computing device. Moreover, the content-on-endpoint table (stored locally or in the computing cloud) may be queried from any endpoint computing device for selection and playback of content items.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for presenting content comprising:
aggregating endpoint metadata including endpoint computing device capability and network location for each of a plurality of endpoint computing devices in a computing system and content metadata of content including access restrictions, encoding bit rate, format, and playback state of content stored on each endpoint computing device into a content-on-endpoint table;
receiving a request for a content item on a selected endpoint computing device;
querying the content-on-endpoint table to find instances of the content item and corresponding endpoint computing device locations;
generating a ranked list of instances of the content item by awarding a score based on selection criteria from the group consisting of access restrictions, network topology, and network bandwidth; and
selecting an instance of the content item from the ranked list of instances for playback by the selected endpoint computing device based on a hardware capability of the selected endpoint computing device and on one or more of the aggregated endpoint metadata and the content metadata.

2. The method of claim 1, wherein the content-on-endpoint table is stored at cloud storage accessible by each endpoint computing device in the computing system.

3. The method of claim 1, wherein the content-on-endpoint table is stored at each endpoint computing device in the computing system.

4. The method of claim 1, further comprising:
selecting a highest-ranked instance of the content item from the ranked list for playback by the selected endpoint computing device.

5. The method of claim 1, wherein selection criteria includes service and/or user cost.

6. The method of claim 1, wherein selection criteria includes endpoint computing device availability and/or instance availability, connectivity speed/rate, and/or network proximity/latency of an endpoint computing device on which an instance of the content item is stored.

7. The method of claim 1, wherein endpoint metadata includes one or more of online status, connectivity and speed/rate.

8. A system comprising:
a plurality of endpoint computing devices in communication, each endpoint computing device comprising:
a location aware playback module configured to enable metadata synchronization of the plurality of endpoint computing devices and receive a request for a content item on a selected endpoint computing device, query a content-on-endpoint table of aggregated endpoint metadata including endpoint computing device capability and network location for each of the plurality of endpoint computing devices and content metadata including access restrictions, encoding bit rate, format, and playback state stored on each endpoint computing device of the plurality of endpoint computing devices to find instances of the content item and corresponding endpoint computing device locations, generate a ranked list of instances of the content item, retrieved from querying data storage, based on selection criteria, the selection criteria including a hardware capability of the selected endpoint computing device, and select an instance of the content item from the ranked list for playback by the selected endpoint computing device.

9. The system of claim 8, wherein the data storage of aggregated endpoint metadata and content data is stored in a computing cloud and accessible by each of the plurality of endpoint computing devices.

10. The system of claim 8, wherein the data storage of aggregated endpoint metadata and content data is stored on each of the plurality of endpoint computing devices.

11. The system of claim 8, wherein playback includes receiving a copy of a selected instance of the content item at the selected endpoint computing device via a native application executable by the selected endpoint computing device.

12. The system of claim 11, wherein the copy of the selected instance of the content item is stored on another endpoint computing device that is directly connected to the selected endpoint computing device.

13. The system of claim 11, wherein the copy of the selected instance of the content item is stored on another endpoint computing device that is connected to the selected endpoint computing device via a local area network.

14. The system of claim 8, wherein playback includes streaming a selected instance of the content item to the selected endpoint computing device via a web application programming interface.

15. The system of claim 8, wherein selection criteria further includes, service and/or user cost, endpoint computing device availability and/or instance availability, connectivity speed/rate, and/or network proximity/latency of an endpoint computing device on which an instance of the content item is stored.

16. The system of claim 8, wherein endpoint metadata includes online status, and connectivity speed/rate.

17. A data-storage device holding instructions executable by a processing device to:
aggregate endpoint metadata including endpoint computing device capability, online status, connectivity speed/rate, and network location for each of a plurality of endpoint computing devices in a computing system and content metadata including access restrictions, encoding bit rate, format, and playback state of content stored on each endpoint computing device into a content-on-endpoint table;

receive a request for a content item on a selected endpoint computing device;

query the content-on-endpoint table to find instances of the content item and corresponding endpoint computing device locations;

generate a ranked list of instances of the content item based on selection criteria including a hardware capability of the selected endpoint computing device and awarding a score for one or more of:

service and/or user cost, where the score is increased for a lower cost connection and decreased for a higher cost connection, endpoint computing device availability and/or instance availability, where the score is increased for instances stored on non-transient endpoint computing devices and decreased for instances stored on transient endpoint computing devices, connectivity speed/rate, where the score is increased based on how well an instance matches the endpoint computing device selected for playback, and network proximity/latency of an endpoint computing device on which an instance of the content item is stored, where the score is increased for instances stored closer on a network topology and decreased for instances stored farther on the network topology; and select a highest ranked instance of the content item from the ranked list for playback by the selected endpoint computing device.

18. The data-holding device of claim 17, wherein the content-on-endpoint table is stored on each endpoint computing device in the computing system.

19. The data-holding device of claim 17, wherein playback includes receiving a copy of a selected instance of the content item via a native application executable by the selected endpoint computing device or streaming the selected instance of the content item to the selected endpoint computing device via a web application programming interface.

* * * * *